United States Patent
Hamilton et al.

(10) Patent No.: US 12,468,168 B2
(45) Date of Patent: Nov. 11, 2025

(54) RETICLE FOR A VIEWING OPTIC

(71) Applicant: Sheltered Wings, Inc., Barneveld, WI (US)

(72) Inventors: Samuel Hamilton, Barneveld, WI (US); Calen Havens, Barneveld, WI (US); Ian Klemm, Barneveld, WI (US); Tom Cody, Barneveld, WI (US); Craig Schultz, Barneveld, WI (US); Garrison Bollig, Barneveld, WI (US); Andy Carlson, Barneveld, WI (US); William Lowry, Barneveld, WI (US); Cory Taylor, Barneveld, WI (US); Tim Rue, Barneveld, WI (US); Alexander Lewis, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 400 days.

(21) Appl. No.: 17/678,639

(22) Filed: Feb. 23, 2022

(65) Prior Publication Data

US 2022/0179226 A1    Jun. 9, 2022

Related U.S. Application Data (63) Continuation-in-part of application No. 17/308,551, filed on May 5, 2021.

(Continued)

(51) Int. Cl.
*F41G 1/38* (2006.01)
*G02B 27/32* (2006.01)

(52) U.S. Cl.
CPC ............... *G02B 27/32* (2013.01); *F41G 1/38* (2013.01)

(58) Field of Classification Search
CPC . F41G 3/065; F41G 1/38; F41G 1/473; F41G 11/003; F41G 3/08; F41G 3/165; F41G 11/004; F41G 1/32; F41G 1/345
See application file for complete search history.

(56) References Cited

U.S. PATENT DOCUMENTS

| | | |
|---|---|---|
| 2,514,257 A | 7/1950 | Reavis |
| 3,058,391 A | 10/1962 | Leupold |

(Continued)

FOREIGN PATENT DOCUMENTS

| | | |
|---|---|---|
| CN | 106680917 A | 5/2017 |
| EP | 1340956 | 12/2006 |

(Continued)

OTHER PUBLICATIONS

International Search Report and Written Opinion for International Application No. PCT/US2020/014082 dated Apr. 1, 2020, 18 pages.

(Continued)

*Primary Examiner* — Michael D David
(74) *Attorney, Agent, or Firm* — Husch Blackwell LLP (57) ABSTRACT

The disclosure relates to a reticle, and particularly a reticle having a marking feature that is translucent. A marking feature may be made from an etched pattern, a gradient, a coating, paint, a filament, or a combination thereof. Reticles may also include an additional feature, such as a center dot, crosshairs, range estimation feature, drop estimation feature, wind point-of-impact estimation feature, moving target point-of-impact feature, and combinations thereof. The additional feature may, but is not required to be, translucent.

14 Claims, 7 Drawing Sheets

Related U.S. Application Data (60) Provisional application No. 63/020,394, filed on May 5, 2020.

(56) References Cited

U.S. PATENT DOCUMENTS

| | | |
|---|---|---|
| 3,464,770 A | 9/1969 | Schmidt |
| 3,533,696 A | 10/1970 | De Winter |
| 3,597,040 A | 8/1971 | Gotoh |
| 4,248,496 A | 2/1981 | Akin et al. |
| 4,395,096 A | 7/1983 | Gibson |
| 4,554,744 A | 11/1985 | Huckenbeck |
| 4,561,204 A | 12/1985 | Binion |
| 4,695,161 A | 9/1987 | Reed |
| 4,965,439 A | 10/1990 | Moore |
| 5,026,158 A | 6/1991 | Golubic |
| 5,052,801 A | 10/1991 | Downes, Jr. et al. |
| 5,092,670 A | 3/1992 | Preston |
| 5,225,838 A | 7/1993 | Kanter et al. |
| 5,291,263 A | 3/1994 | Kong |
| 5,303,495 A | 4/1994 | Harthcock |
| 5,311,203 A | 5/1994 | Norton |
| 5,339,720 A | 8/1994 | Pellarin et al. |
| 5,355,224 A | 10/1994 | Wallace |
| 5,375,072 A | 12/1994 | Cohen |
| 5,491,546 A | 2/1996 | Wascher |
| 5,528,354 A | 6/1996 | Uwira |
| 5,669,174 A | 9/1997 | Teetzel |
| 5,686,690 A | 11/1997 | Lugheed et al. |
| 5,721,641 A | 2/1998 | Aoki |
| 5,771,623 A | 6/1998 | Pernstich et al. |
| 5,903,996 A | 5/1999 | Morley |
| 5,920,995 A | 7/1999 | Sammut |
| 5,926,259 A | 7/1999 | Bamberger et al. |
| 6,032,374 A | 3/2000 | Sammut |
| 6,128,054 A | 10/2000 | Schwarzenberger |
| 6,132,048 A | 10/2000 | Gao et al. |
| 6,247,259 B1 | 6/2001 | Tsadka et al. |
| 6,252,706 B1 | 6/2001 | Kaladgew |
| 6,269,581 B1 | 8/2001 | Groh |
| 6,330,121 B1 | 12/2001 | Kobayashi et al. |
| 6,453,595 B1 | 9/2002 | Sammut |
| 6,516,551 B2 | 2/2003 | Gaber |
| 6,516,699 B2 | 2/2003 | Sammut et al. |
| 6,583,862 B1 | 6/2003 | Perger |
| 6,614,975 B2 | 9/2003 | Richardson et al. |
| 6,640,482 B2 | 11/2003 | Carlson |
| 6,681,512 B2 | 1/2004 | Sammut |
| 6,691,447 B1 | 2/2004 | Otteman |
| 6,862,832 B2 | 3/2005 | Barrett |
| 7,124,531 B1 | 10/2006 | Florence et al. |
| 7,196,329 B1 | 3/2007 | Wood et al. |
| 7,269,920 B2 | 9/2007 | Staley, III |
| 7,295,296 B1 | 11/2007 | Galli |
| 7,296,358 B1 | 11/2007 | Murphy et al. |
| 7,310,071 B2 | 12/2007 | Cuprys |
| 7,325,320 B2 | 2/2008 | Gnepf et al. |
| 7,333,270 B1 | 2/2008 | Pochapsky et al. |
| 7,516,571 B2 | 4/2009 | Scrogin et al. |
| 7,575,327 B2 | 8/2009 | Uchiyama |
| 7,586,586 B2 | 9/2009 | Constantikes |
| 7,614,805 B2 | 11/2009 | Showalter |
| 7,654,029 B2 | 2/2010 | Peters et al. |
| 7,690,145 B2 | 4/2010 | Peters et al. |
| 7,703,679 B1 | 4/2010 | Bennetts et al. |
| 7,712,225 B2 | 5/2010 | Sammut |
| 7,719,769 B2 | 5/2010 | Sugihara et al. |
| 7,721,481 B2 | 5/2010 | Houde-Walter |
| 7,805,020 B2 | 9/2010 | Trudeau et al. |
| 7,832,137 B2 | 11/2010 | Sammut et al. |
| 7,856,750 B2 | 12/2010 | Sammut et al. |
| 7,859,650 B2 | 12/2010 | Vermillion et al. |
| 7,864,432 B2 | 1/2011 | Ottney |
| 7,905,046 B2 | 3/2011 | Smith et al. |
| 7,911,687 B2 | 3/2011 | Scholz |
| 7,937,878 B2 | 5/2011 | Sammut et al. |
| 7,946,048 B1 | 5/2011 | Sammut |
| 8,001,714 B2 | 8/2011 | Davidson |
| 8,046,951 B2 | 11/2011 | Peters et al. |
| 8,051,597 B1 | 11/2011 | D'Souza et al. |
| 8,081,298 B1 | 12/2011 | Cross |
| 8,109,029 B1 | 2/2012 | Sammut et al. |
| 8,201,741 B2 | 6/2012 | Bennetts et al. |
| 8,230,635 B2 | 7/2012 | Sammut et al. |
| 8,353,454 B2 | 1/2013 | Sammut et al. |
| 8,365,455 B2 | 2/2013 | Davidson et al. |
| 8,448,372 B2 | 5/2013 | Peters et al. |
| 8,468,930 B1 | 6/2013 | Bell |
| 8,488,969 B1 | 7/2013 | Masarik |
| 8,656,630 B2 | 2/2014 | Sammut |
| 8,707,608 B2 | 4/2014 | Sammut et al. |
| 8,713,843 B2 | 5/2014 | Windauer |
| 8,826,583 B2 | 9/2014 | Kepler et al. |
| 8,833,655 B2 | 9/2014 | McCarty et al. |
| 8,857,714 B2 | 10/2014 | Benson |
| 8,886,046 B2 | 11/2014 | Masarik |
| 8,893,971 B1 | 11/2014 | Sammut et al. |
| 8,905,307 B2 | 12/2014 | Sammut et al. |
| 8,923,703 B2 | 12/2014 | Masarik et al. |
| 8,959,824 B2 | 2/2015 | Sammut et al. |
| 8,966,806 B2 | 3/2015 | Sammut et al. |
| 8,991,702 B1 | 3/2015 | Sammut et al. |
| 9,038,901 B2 | 5/2015 | Paterson et al. |
| 9,042,736 B2 | 5/2015 | Masarik |
| 9,068,794 B1 | 6/2015 | Sammut |
| 9,121,671 B2 | 9/2015 | Everett |
| 9,151,574 B2 | 10/2015 | Lowrey, III |
| 9,175,927 B2 | 11/2015 | Tubb |
| 9,225,419 B2 | 12/2015 | Masarik |
| 9,250,038 B2 | 2/2016 | Sammut et al. |
| 9,255,771 B2 | 2/2016 | Sammut et al. |
| 9,279,975 B2 | 3/2016 | Berlips |
| 9,310,163 B2 | 4/2016 | Bay |
| 9,322,616 B2 | 4/2016 | Craven et al. |
| 9,323,061 B2 | 4/2016 | Edwards et al. |
| 9,335,123 B2 | 5/2016 | Sammut |
| 9,389,425 B2 | 7/2016 | Edwards et al. |
| 9,429,745 B2 | 8/2016 | Brumfield |
| 9,438,774 B2 | 9/2016 | Masarik |
| 9,459,077 B2 | 10/2016 | Sammut et al. |
| 9,500,444 B2 | 11/2016 | Sammut et al. |
| 9,516,202 B2 | 12/2016 | Masarik et al. |
| 9,574,850 B2 | 2/2017 | Sammut et al. |
| 9,593,907 B2 | 3/2017 | Regan et al. |
| 9,612,086 B2 | 4/2017 | Sammut et al. |
| 9,615,004 B2 | 4/2017 | Masarik |
| 9,625,723 B2 | 4/2017 | Lou et al. |
| 9,632,304 B2 | 4/2017 | Waterman |
| 9,705,605 B2 | 7/2017 | Masarik |
| 9,869,530 B2 | 1/2018 | Sammut et al. |
| 9,995,901 B2 | 6/2018 | Petersen |
| 10,003,756 B2 | 6/2018 | Masarik et al. |
| 10,060,703 B2 | 8/2018 | Sammut et al. |
| 10,113,837 B2 | 10/2018 | Masarik et al. |
| 10,175,031 B2 | 1/2019 | VanBecelaere |
| 10,180,565 B2 | 1/2019 | Havens |
| 10,254,082 B2 | 4/2019 | Sammut et al. |
| 10,295,307 B2 | 5/2019 | Sammut et al. |
| 10,379,135 B2 | 8/2019 | Maryfield et al. |
| 10,480,901 B2 * | 11/2019 | Thomas ............... F41G 1/38 |
| 10,534,166 B2 * | 1/2020 | Summerfield ....... G02B 27/142 |
| 10,584,941 B2 | 3/2020 | Masarik et al. |
| 10,649,223 B2 | 5/2020 | Arens |
| 10,673,301 B1 | 6/2020 | McAuley |
| 10,693,341 B1 | 6/2020 | McAuley |
| 10,721,000 B2 | 7/2020 | Masarik et al. |
| 10,742,913 B2 | 8/2020 | Vaklev et al. |
| 10,796,860 B2 | 10/2020 | Iliev et al. |
| 10,801,813 B2 | 10/2020 | Moseman et al. |
| 10,812,687 B2 | 10/2020 | Masarik et al. |
| 10,823,532 B2 * | 11/2020 | Gallery ............... G02B 27/32 |
| 10,900,745 B2 | 1/2021 | Hamilton et al. |
| 10,942,006 B2 * | 3/2021 | VanBecelaere ........ F41G 1/38 |
| 11,107,200 B2 | 8/2021 | Jones et al. |
| 11,473,873 B2 * | 10/2022 | Hamilton ............ F41G 1/38 |

(56) References Cited

U.S. PATENT DOCUMENTS

| | | | |
|---|---|---|---|
| 11,480,781 B2 | 10/2022 | Hamilton et al. | |
| 11,994,364 B2* | 5/2024 | Hamilton | F41G 3/06 |
| 2002/0159148 A1 | 10/2002 | Huber | |
| 2003/0010190 A1 | 1/2003 | Sammut et al. | |
| 2003/0012035 A1 | 1/2003 | Bernard | |
| 2003/0132860 A1 | 7/2003 | Feyereisen et al. | |
| 2004/0025396 A1 | 2/2004 | Schlierbach | |
| 2004/0080938 A1 | 4/2004 | Holman | |
| 2004/0201886 A1 | 10/2004 | Skinner et al. | |
| 2005/0021282 A1 | 1/2005 | Sammut et al. | |
| 2005/0046706 A1 | 3/2005 | Sesek et al. | |
| 2005/0198885 A1 | 9/2005 | Staley, III | |
| 2005/0219690 A1 | 10/2005 | Lin | |
| 2005/0250085 A1 | 11/2005 | Lemp, III et al. | |
| 2005/0252062 A1 | 11/2005 | Scrogin et al. | |
| 2005/0268521 A1 | 12/2005 | Cox et al. | |
| 2006/0048432 A1 | 3/2006 | Staley et al. | |
| 2006/0164724 A1 | 7/2006 | Nagata et al. | |
| 2006/0201047 A1 | 9/2006 | Lowrey | |
| 2006/0254115 A1 | 11/2006 | Thomas et al. | |
| 2007/0044364 A1 | 3/2007 | Sammut et al. | |
| 2007/0097351 A1 | 5/2007 | York et al. | |
| 2007/0137008 A1 | 6/2007 | Anstee | |
| 2007/0137088 A1 | 6/2007 | Peters et al. | |
| 2007/0157502 A1 | 7/2007 | Holmberg | |
| 2007/0180751 A1 | 8/2007 | Joannes | |
| 2007/0223087 A1* | 9/2007 | Pochapsky | G02B 23/12 |
| | | | 359/359 |
| 2007/0234626 A1 | 10/2007 | Murdock et al. | |
| 2007/0277421 A1 | 12/2007 | Perkins et al. | |
| 2008/0039962 A1 | 2/2008 | Mcrae | |
| 2008/0107414 A1 | 5/2008 | Showalter | |
| 2008/0163536 A1 | 7/2008 | Koch et al. | |
| 2008/0290164 A1 | 11/2008 | Papale et al. | |
| 2009/0109404 A1 | 4/2009 | Thornton | |
| 2009/0200376 A1 | 8/2009 | Peters et al. | |
| 2009/0205239 A1 | 8/2009 | Smith, III | |
| 2009/0225236 A1 | 9/2009 | Yoon | |
| 2009/0320348 A1 | 12/2009 | Kelly | |
| 2010/0077646 A1 | 4/2010 | Gaber et al. | |
| 2010/0207152 A1 | 8/2010 | Won | |
| 2010/0225833 A1 | 9/2010 | Methe et al. | |
| 2010/0275768 A1 | 11/2010 | Quinn | |
| 2011/0121159 A1 | 5/2011 | Mourar et al. | |
| 2011/0141381 A1 | 6/2011 | Minikey et al. | |
| 2011/0162250 A1 | 7/2011 | Windauer et al. | |
| 2011/0314720 A1 | 12/2011 | Cheng | |
| 2012/0000108 A1 | 1/2012 | Zusman | |
| 2012/0030985 A1* | 2/2012 | Mauricio | G02B 23/10 |
| | | | 42/84 |
| 2012/0044571 A1 | 2/2012 | Mukawa | |
| 2012/0075168 A1 | 3/2012 | Osterhout et al. | |
| 2012/0097741 A1 | 4/2012 | Karcher | |
| 2012/0126001 A1 | 5/2012 | Justice et al. | |
| 2012/0186131 A1 | 7/2012 | Windauer | |
| 2013/0033746 A1 | 2/2013 | Brumfield | |
| 2013/0167425 A1 | 7/2013 | Crispin | |
| 2013/0199074 A1 | 8/2013 | Paterson et al. | |
| 2013/0279013 A1 | 10/2013 | Edwards et al. | |
| 2014/0059915 A1 | 3/2014 | Sammut et al. | |
| 2014/0063261 A1 | 3/2014 | Betensky et al. | |
| 2014/0075820 A1 | 3/2014 | Ben-Ami | |
| 2014/0101982 A1 | 4/2014 | McPhee | |
| 2014/0110482 A1 | 4/2014 | Bay | |
| 2014/0182187 A1 | 7/2014 | McHale | |
| 2014/0226214 A1 | 8/2014 | Edwards et al. | |
| 2014/0259854 A1 | 9/2014 | Williams et al. | |
| 2015/0055119 A1 | 2/2015 | Hamilton | |
| 2015/0106046 A1 | 4/2015 | Chen et al. | |
| 2015/0124243 A1 | 5/2015 | Stockdill | |
| 2015/0233674 A1 | 8/2015 | Beckman | |
| 2015/0247702 A1 | 9/2015 | Davidson et al. | |
| 2015/0286121 A1 | 10/2015 | Kilcher et al. | |
| 2015/0362288 A1 | 12/2015 | Sammut et al. | |
| 2015/0369565 A1 | 12/2015 | Kepler | |
| 2016/0028970 A1 | 1/2016 | Masarik et al. | |
| 2016/0061566 A1 | 3/2016 | Chen | |
| 2016/0061567 A1 | 3/2016 | Regan et al. | |
| 2016/0069629 A1 | 3/2016 | Seckman | |
| 2016/0138890 A1 | 5/2016 | Hofmann et al. | |
| 2016/0169625 A1 | 6/2016 | Richards et al. | |
| 2016/0195351 A1 | 7/2016 | Burden | |
| 2016/0223293 A1 | 8/2016 | Maryfield et al. | |
| 2016/0223805 A1 | 8/2016 | Waterman | |
| 2016/0265880 A1 | 9/2016 | Maryfield et al. | |
| 2016/0267679 A1 | 9/2016 | Maryfield et al. | |
| 2017/0051993 A1 | 2/2017 | Imbriano et al. | |
| 2017/0143442 A1 | 5/2017 | Tesar et al. | |
| 2017/0227327 A1 | 8/2017 | Thomas et al. | |
| 2017/0343317 A1 | 11/2017 | VanBecelaere | |
| 2018/0024376 A1 | 1/2018 | Dohr et al. | |
| 2018/0224241 A1 | 8/2018 | Havens | |
| 2018/0224244 A1 | 8/2018 | Havens | |
| 2018/0224650 A1 | 8/2018 | Havens | |
| 2018/0224651 A1 | 8/2018 | Havens | |
| 2018/0224652 A1 | 8/2018 | Havens | |
| 2018/0224653 A1 | 8/2018 | Cross | |
| 2019/0146205 A1 | 5/2019 | Havens | |
| 2019/0219812 A1 | 7/2019 | Havens | |
| 2019/0324260 A1 | 10/2019 | Hamilton | |
| 2020/0049455 A1 | 2/2020 | Hamilton et al. | |
| 2020/0232762 A1 | 7/2020 | Hamilton et al. | |

FOREIGN PATENT DOCUMENTS

| | | |
|---|---|---|
| EP | 1772695 | 7/2010 |
| GB | 2512915 A | 10/2014 |
| JP | 1-154113 A | 6/1989 |
| JP | 2007132973 A | 5/2007 |
| JP | 2015-520866 A | 7/2015 |
| JP | 2020506434 A | 2/2020 |
| WO | 2005015285 A2 | 2/2005 |
| WO | 2006/060007 | 6/2006 |
| WO | 2011158013 A1 | 12/2011 |
| WO | 2014/167276 | 10/2014 |
| WO | 2015/103155 | 7/2015 |
| WO | 2016/033565 A1 | 3/2016 |
| WO | 2016205346 A1 | 12/2016 |
| WO | 2018145097 | 8/2018 |
| WO | 2018/172738 A1 | 9/2018 |
| WO | 2019173317 A1 | 9/2019 |
| WO | 2020033369 A1 | 2/2020 |
| WO | 2022201094 A1 | 9/2022 |

OTHER PUBLICATIONS

International Search Report and Written Opinion for International Application No. PCT/US19/45493 dated Apr. 28, 2020, 13 pages.

ATN X-Sight 3-12x Digital Scopes for Rifles—Day & Night vision optics https://www.atncorp.com/x-sight-night-vision-rifle-scope-3-12x printed Jul. 12, 2016 10 pages.

Barska 2013 Master Catalog 2013 124 pages.

T. Edwards et al. High-brightness display in integrated weapon sight systems abstract http://proceedings.spiedigitallibrary.org/proceeding.aspx?articleid=1882790 printed Jul. 12, 2016 2 pages.

3-9x First Focal Plane Adjustable Objective Rifle Scope—Monstrum Tactical; http://monstrumtractical.com/products/3-9x-first-focal-plan-rifle-scope-adjustable-objective-range-finder-reticle?variant=15621625091 printed Jul. 12, 2016 7 pages.

Nightforce Optics Inc. RETICLE MIL-R product sheets 2013 2 pages.

International Search Report and Written Opinion for International Patent Application No. PCT/US19/28540, dated Aug. 16, 2019, 7 pages.

International Search Report and Written Opinion for International Patent Application No. PCT/US2018/017079 dated Apr. 26, 2018, 29 pages.

International Search Report and Written Opinion for International Application No. PCT/US2021/030874 dated Aug. 13, 2021, 13 pages.

(56) References Cited

OTHER PUBLICATIONS

International Search Report and Written Opinion for International Application No. PCT/US2023/063104 dated Jul. 3, 2023, 10 pages.
International Preliminary Report on Patentability issued for International Application No. PCT/US2021/030874 dated Nov. 8, 2022, 8 pages.
International Search Report and Written Opinion for International Application No. PCT/US2023/063104, Dated Jul. 3, 2023, 6 pages.

* cited by examiner

RETICLE FOR A VIEWING OPTIC

CROSS REFERENCE TO RELATED APPLICATIONS

This application is a continuation-in-part application of U.S. patent application Ser. No. 17/308,551 filed May 5 2021, which claims priority to U.S. Provisional Patent Application No. 63/020,394 filed May 5, 2020, all of which are incorporated herein by reference in their entireties.

FIELD

The disclosure relates to reticles for viewing optics, and more particularly to reticles for viewing optics that utilize translucent markings.

BACKGROUND

A riflescope using an active reticle or disturbed reticle, as well as smart riflescopes, provide, among other information, digital aim points for a user. Typically, users want an etched reticle to be included so that the users can have a functional sight at a low power state or for situations when there is no power.

A reticle can be positioned at a first focal plane, a second focal plane or some instances both the first focal plane and second focal plane. First focal plane reticles have a number of advantages. Notably, the reticle scales with the magnification, as the first focal plane is ahead of the magnifying lens, and have sufficient required detail at high magnifications. First focal plane reticles can also be unobtrusive at low power. Lower power first focal plane optics often have reticles with bold lines so the user has a bold aiming point at low magnification (1× magnification) for fast, close quarters battles. The downside to the bold lines is that they can be obscuring at higher magnifications.

For a viewing optic having a projected digital image from an active display at the first focal plane reticle, the reticle lines, at times and under certain conditions, could possibly block a portion of the projected digital image, particularly when the viewing optic is set at a higher magnification. If smaller, thinner marking are used so the digital image generated from the active display isn't blocked, the reticle could possibly lose effectiveness as low magnification.

Accordingly, the need exists for a reticle that can be used in the first focal plane or second focal plane, and when used in the first focal plane allows for a dominant etched reticle feature useful for close quarters situations and does not occlude overlayed digital images projected onto the reticle.

SUMMARY

In one embodiment, the disclosure provides a reticle. In an embodiment, the reticle comprises one or more features that are translucent. In an embodiment, the reticle comprises one or more marking features that are translucent. In an embodiment, the reticle comprises a primary marking feature that is translucent. In an embodiment, the reticle comprises two or more primary marking features that are translucent.

In an embodiment, the marking feature is made from an etched pattern, a gradient, a coating, paint, a filament, or combination thereof. In a particular embodiment, the marking feature is etched with a pattern. In an embodiment, the pattern is a crosshatch pattern. In another embodiment, the marking feature is selected from the group consisting of crosshairs, duplex crosshairs, post reticle, German reticle, ring reticle, triangle reticle, broken circle, and combinations thereof. In further embodiments, the reticle further includes an additional element selected from the group consisting of center dot, crosshairs, range estimation feature, drop estimation feature, wind point-of-impact estimation feature, moving target point-of-impact feature, and combinations thereof. In an embodiment, the additional element is not translucent. In another embodiment, the additional element is translucent.

In a further embodiment, the amount of light passing through the primary marking feature is from less than 100% to greater than or equal to 60%. In yet a further embodiment, the amount of light passing through the primary marking feature is from less than or equal to 96% to greater than or equal to 66%. In still a further embodiment, the amount of light passing through the primary marking feature is from less than or equal to 88% to greater than or equal to 74%.

In one embodiment, the disclosure provides a viewing optic. In one embodiment, the disclosure provides a viewing optic having an active display configured to generate a digital image projected into a first focal plane and a reticle in accordance with any embodiment or combination or embodiments described herein at the first focal plane. In accordance with some embodiments, the viewing optic is a gunsight.

In one embodiment, the disclosure provides a gunsight. In an embodiment, the gunsight comprises a housing; an objective lens assembly mounted within a first end of the housing; an ocular lens assembly mounted within a second end of the housing; one or more optical components mounted within the housing between the objective lens assembly and ocular lens assembly; and a reticle comprising a marking feature that is translucent. In one embodiment, the gunsight further comprises an active display for generating a digital image.

In an embodiment, the reticle is located at a first focal plane. In another embodiment, the reticle is located at a second focal plane.

In an embodiment, the reticle is located at a first focal plane, and the gunsight further includes an active display that projects an image on the reticle.

In an embodiment, the marking feature is made from an etched pattern, a gradient, a coating, paint, a filament, or combination thereof. In an embodiment, the amount of light passing through the marking feature is from less than 100% to greater than or equal to 60%. In a further embodiment, the amount of light passing through the marking feature is from less than or equal to 88% to greater than or equal to 74%.

In one embodiment, a viewing optic is provided including a main tube, an objective system coupled to a first end of the main tube and an ocular system coupled to a second end of the main tube. The main tube, the objective system and the ocular system are cooperatively configured to define at least one focal plane. The viewing optic further includes a beam combiner located between the objective system and a first focal plane having a reticle with a marking feature that is translucent. The viewing optic further includes a display system comprising an active display, wherein the active display generates and projects a digital image to the beam combiner so the digital image and the target image from the objective lens system can be combined at the first focal plane.

In one embodiment, the disclosure relates to a viewing optic with a first optical system comprised of an objective lens system that focuses an image from a target down to a first focal plane having a reticle with a marking feature that is translucent (hereafter referred to as the "FFP Target Image"), followed by an erector lens system that inverts the FFP Target Image and focuses it to a second focal plane (hereafter referred to as the "SFP Target Image"), a beam combiner that is placed between the objective lens system and the FFP Target Image, an eyepiece lens system that collimates the SFP Target Image so that it can be observed by the human eye, and a second optical system. In one embodiment, the second optical system has an active display for generating an image, and a lens system that collects the light from the active display. The image from the digital display is directed to the beam combiner so that the digital image and the target image from the objective lens system can be combined at the first focal plane and viewed simultaneously.

In one embodiment, the viewing optic is used in conjunction with a firearm. In one embodiment, the viewing optic is a riflescope. In one embodiment, the riflescope can be used with an external laser rangefinder with ballistic calculation capability. In one embodiment, the riflescope is rigidly mounted to the firearm and the laser rangefinder is mounted to either the firearm or the riflescope.

Other embodiments will be evident from a consideration of the drawings taken together with the detailed description provided below.

DETAILED DESCRIPTION

The disclosure relates to reticles for viewing optics and related devices, and more particularly to reticles for telescopic gunsights and associated equipment. Certain preferred and illustrative embodiments of the invention are described below. The present invention is not limited to these embodiments.

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on", "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, an "active display" comprises image-creating pixel modulation. In one embodiment, the active display is an emissive active display. Emissive active displays, including but not limited to Organic light-emitting diodes (OLED) and Light-Emitting Diodes (LED), feature the image and light source in a single device, and therefore an external light source is not required. This minimizes system size and power consumption, while providing exceptional contrast and color space. OLEDs are made from ultra-thin organic semiconducting layers, which light up when they are connected to voltage (charge carriers become injected and luminance mainly is proportional to the forward current). The major layers comprise several organic materials in sequence (for example, charge transport, blocking and emission layers—each with a thickness of several nanometers), which are inserted between an anode and a cathode. The terms "active display," "digital display" and "microdisplay" are used interchangeably.

As used herein, "ballistics" is a way to precisely calculate the trajectory of a bullet based on a host of factors.

As used herein, an "erector sleeve" is a protrusion from the erector lens mount which engages a slot in the erector tube and/or cam tube or which serves an analogous purpose. This could be integral to the mount or detachable As used herein, an "erector tube" is any structure or device having an opening to receive an erector lens mount.

As used herein, the term "firearm" refers to any device that propels an object or projectile, for example, in a controllable flat fire, line of sight, or line of departure, for example, hand-guns, pistols, rifles, shotgun slug guns, muzzleloader rifles, single shot rifles, semi-automatic rifles and fully automatic rifles of any caliber direction through any media. As used herein, the term "firearm" also refers to a remote, servo-controlled firearm wherein the firearm has auto-sensing of both position and directional barrel orientation. The shooter is able to position the firearm in one location, and move to a second location for target image acquisition and aiming. As used herein, the term "firearm" also refers to chain guns, belt-feed guns, machine guns, and Gattling guns. As used herein, the term firearm also refers to high elevation, and over-the-horizon, projectile propulsion devices, for example, artillery, mortars, canons, tank canons or rail guns of any caliber.

As used herein, a "reticle," in one embodiment, is an aiming pattern for a viewing optic, such as, but not limited to, a crosshair aiming point or other aiming pattern.

As used herein, the term "transparent" refers to a material through which a majority of light passes without refraction. With a transparent material, shapes are clearly seen through the material.

As used herein, the term "translucent" refers to a material through which a portion of light passes and, in some instances, the light may be refracted. In some embodiments, the amount of light passing through a translucent material is less than 100%, or less than or equal to 98%, or less than or equal to 96%, or less than or equal to 94%, or less than or equal to 92%, or less than or equal to 90%, or less than or equal to 88%, or less than or equal to 86%, or less than or equal to 84%, or less than or equal to 82%, or less than or equal to 80% to greater than or equal to 60%, or greater than or equal to 62%, or greater than or equal to 64%, greater than or equal to 66%, or greater than or equal to 68%, or greater than or equal to 70%, or greater than or equal to 72%, or greater than or equal to 74%, or greater than or equal to 76%, or greater than or equal to 78%.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "outward scene" refers to a real world scene, including but not limited to a target.

As used herein, the term "shooter" applies to either the operator making the shot or an individual observing the shot in collaboration with the operator making the shot.

Figure 1:
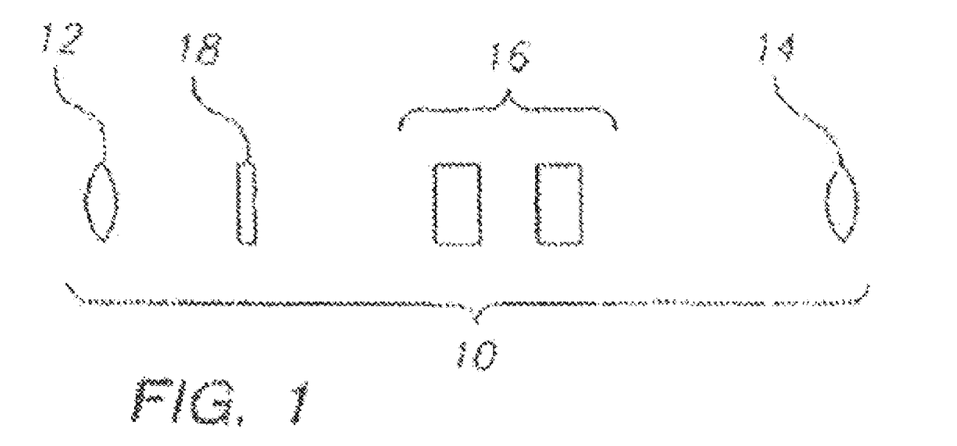
FIG. 1 is a diagram showing the optical components of a telescopic gunsight of the disclosure.
Figure 2:
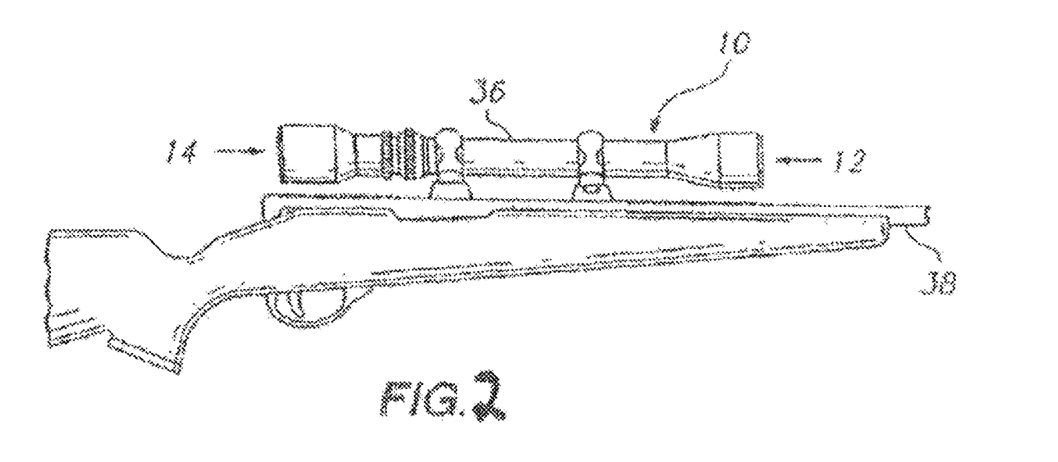
FIG. 2 is a partial side view of an example of a firearm showing a telescopic gunsight mounted on the barrel.

As exemplified in FIGS. 1 and 2, a telescopic gunsight 10 (also referred to herein as a "scope") includes a housing 36 that can be mounted in fixed relationship with a gun barrel 38. Housing 36 is preferably constructed from steel or aluminum, but can be constructed from virtually any durable, substantially rigid material that is useful for constructing optical equipment. Mounted in housing 36 at one end is an objective lens or lens assembly 12. Mounted in housing 38 at the opposite end is an ocular lens or lens assembly 14.

As used herein, the term "lens" refers to an object by means of which light rays, thermal, sonar, infrared, ultraviolet, microwave or radiation of other wavelength is focused or otherwise projected to form an image. It is well known in the art to make lenses from either a single piece of glass or other optical material (such as transparent plastic) which has been conventionally ground and polished to focus light, or from two or more pieces of such material mounted together, for example, with optically transparent adhesive and the like to focus light. Accordingly, the term "lens" as used herein is intended to cover a lens constructed from a single piece of optical glass or other material, or multiple pieces of optical glass or other material (for example, an achromatic lens), or from more than one piece mounted together to focus light, or from other material capable of focusing light. Any lens technology now known or later developed finds use with the present invention. For example, any lens based on digital, hydrostatic, ionic, electronic, magnetic energy fields, component, composite, plasma, adoptive lens, or other related technologies may be used. Additionally, moveable or adjustable lenses may be used. As will be understood by one having skill in the art, when the scope 10 is mounted to, for example, a gun, rifle or weapon 38, the objective lens (that is, the lens furthest from the shooter's eye) 12 faces the target, and the ocular lens (that is, the lens closest to the shooter's eye) 14 faces the shooter's eye.

Other optical components that may be included in housing 36 include variable power optical components 16 for a variable power scope. Such components 16 typically include magnifiers and erectors. Such a variable power scope permits the user to select a desired power within a predetermined range of powers. For example, with a 3-12×50 scope, the user can select a lower power (e.g., 3×50) or a high power (e.g., 12×50) or any power along the continuous spectrum.

Finally, a reticle assists the shooter in hitting the target. The reticle is typically (but not necessarily) constructed using optical material, such as optical glass or plastic, or similar transparent or translucent material, and takes the form of a disc or wafer with substantially parallel sides. A reticle may, for example, be constructed from wire, spider web, nano-wires, an etching, or may be analog or digitally printed, or may be projected (for example, on a surface) by, for example, a mirror, video, holographic projection, or other suitable means on one or more wafers of material. In the embodiments provided herein, the reticles are etched or wire. The etching may be filled in with a reflective material, for example, titanium oxide, that illuminates when a light or diode powered by, for example, a battery, chemical or photovoltaic source, is rheostatically switched on compensating for increasing (+) or decreasing (−) light intensity.

The reticle is mounted anywhere between the ocular lens 14 and the objective lens 12 of FIG. 1. In one embodiment, the viewing optic has a main optical system comprised of an objective lens system that focuses an image from a target down to a first focal plane (hereafter referred to as the "FFP Target Image"), followed by an erector lens system that inverts the FFP Target Image and focuses it to a second focal plane (hereafter referred to as the "SFP Target Image"), an eyepiece lens system that collimates the SFP Target Image so that it can be observed by the human eye, and a second optical system. In some embodiments, a beam combiner is placed between the objective lens system and the first focal plane.

Figure 3:
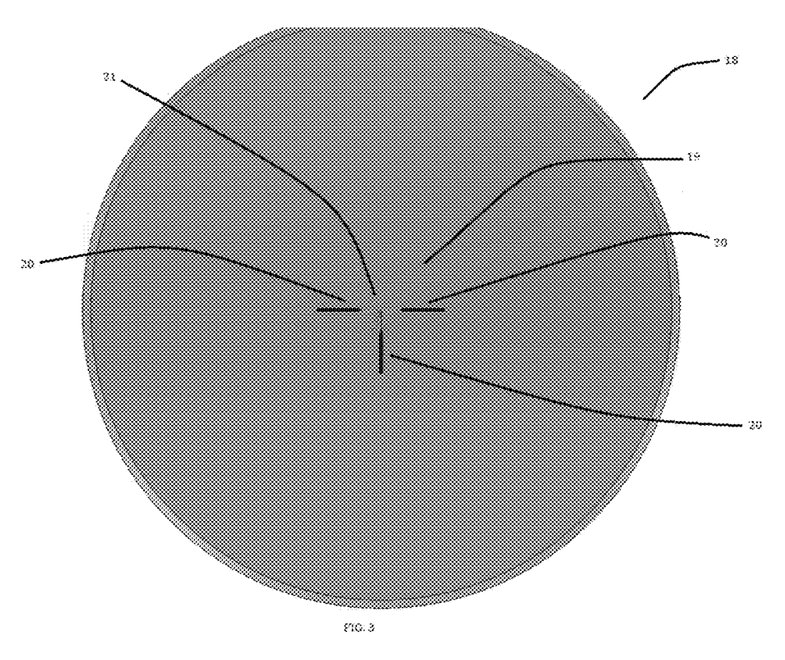
FIG. 3 shows a first embodiment of a reticle, in accordance with embodiments of the disclosure, used as a first focal plane reticle at low magnification.

FIG. 3 illustrates an exemplary reticle 18 at low (1×) magnification. In the embodiment shown, the reticle 18 is used as a first focal plane reticle, but it will be appreciated that the reticle could easily be used in the second focal plane as well. The first focal plane is located near the objective lens, while the second focal plane is located near the ocular lens. The first focal plane is generally between the optical components 16 and the objective lens 12. The second focal plan is generally between the optical components 16 and the ocular lens 14.

The reticle 18 includes a primary marking feature 19 that is a post reticle. The post reticle is composed of three solid-looking markings 20 pointing to a general central location 21. The solid appearance of the primary marking feature 19 renders it useful as an aiming mechanism in close quarters situations without being washed out or obscured by movement or changing backgrounds.

Figure 4:
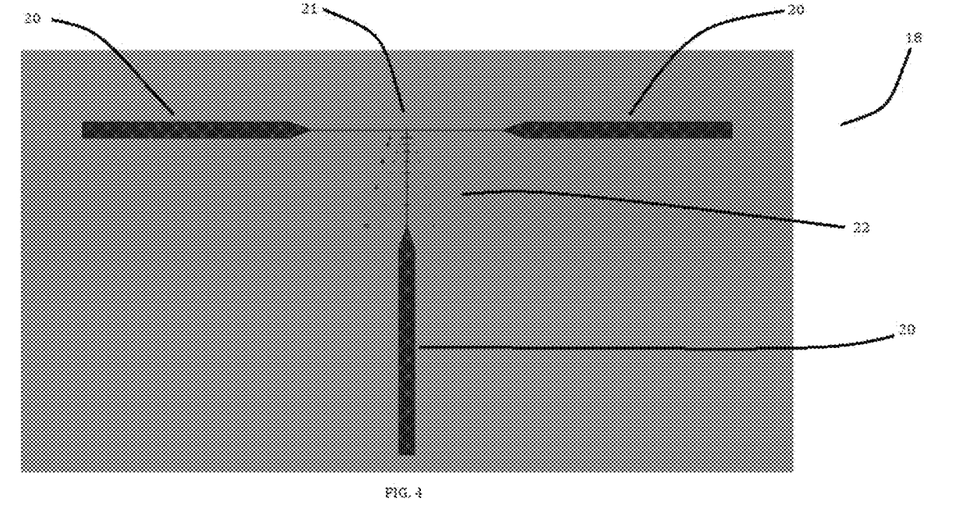
FIG. 4 shows the reticle of FIG. 3 at higher magnification.

FIG. 4 shows the same reticle 18 at a higher magnification. While the primary marking feature 19 appeared solid at low magnification, it is shown in FIG. 4 that the primary marking feature 19 is translucent. That is, the primary marking feature 19 allows a portion of light to pass through, but not all of it. As a result, a portion of the background is seen through the primary marking feature 19.

Figure 5:
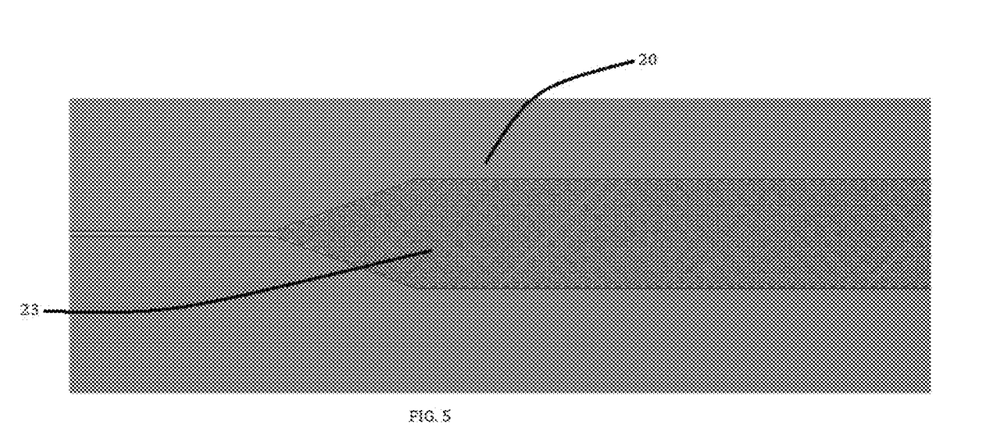
FIG. 5 shows a portion of the reticle of FIG. 3 in close-up.

In the particular embodiment shown, the reticle 18 is an etched reticle, and the primary marking feature 19 is etched with a crosshatch pattern 23. This crosshatch pattern 23 is more clearly shown in FIG. 5. The voids in the crosshatch pattern 23 allow light from a display to pass through, therefore not disturbing a projected image for a user. In other embodiments, the translucent property of the primary marking feature 19 may be provided by a different etching pattern, a gradient, the use of a coating, paint or filament, or combination of these and other methods of providing translucency to the primary marking feature 19.

Additional elements 22 of the reticle 18 are also shown in FIG. 4. For example, in some embodiments, a reticle 18 includes a center dot, crosshairs, range estimation feature, drop estimation feature, wind point-of-impact estimation feature, moving target point-of-impact feature, and combinations of these and other features known in the art. As shown in FIG. 4, these additional elements 22, while somewhat observable at low magnification, are more clearly visible to a user at higher magnifications and therefore do not, necessarily, require the same level of translucency as the primary marking feature 19. In some embodiment, however, the additional elements 22 are etched with a crosshatch pattern, as with the primary marking feature 19, or otherwise provided with an element of translucency as described with respect to the primary marking feature 19.

Figure 6:
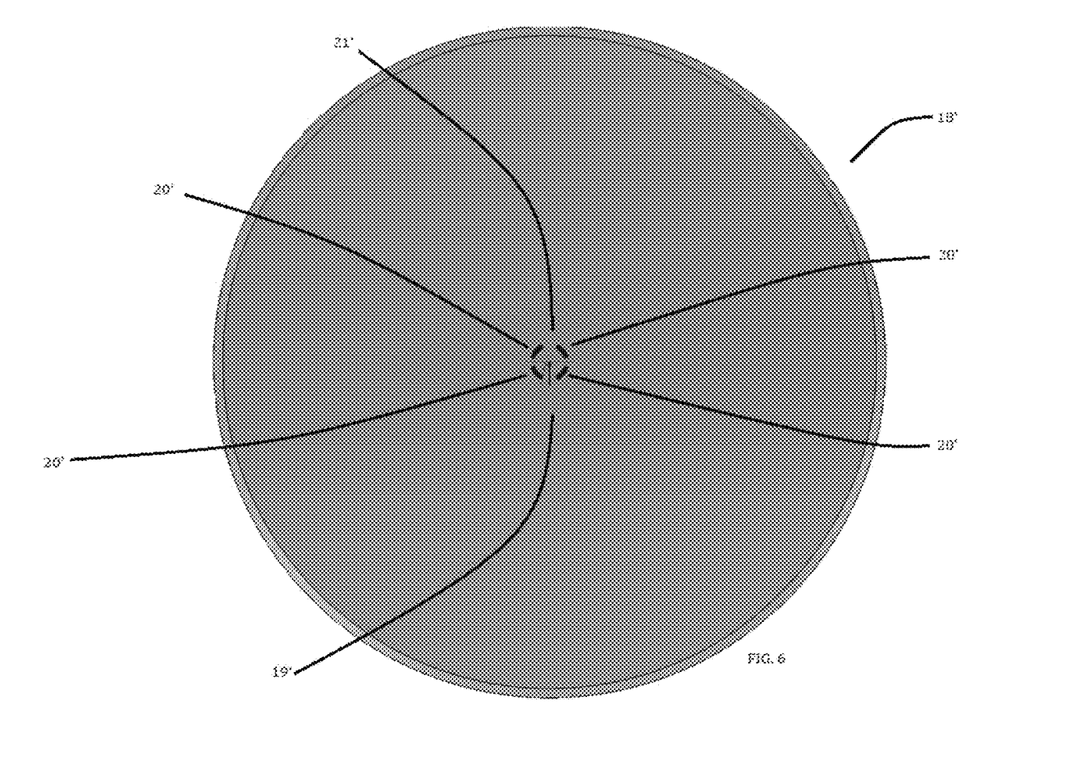
FIG. 6 shows a second embodiment of a reticle, in accordance with embodiments of the disclosure, used as a first focal plane reticle at low magnification.
Figure 7:
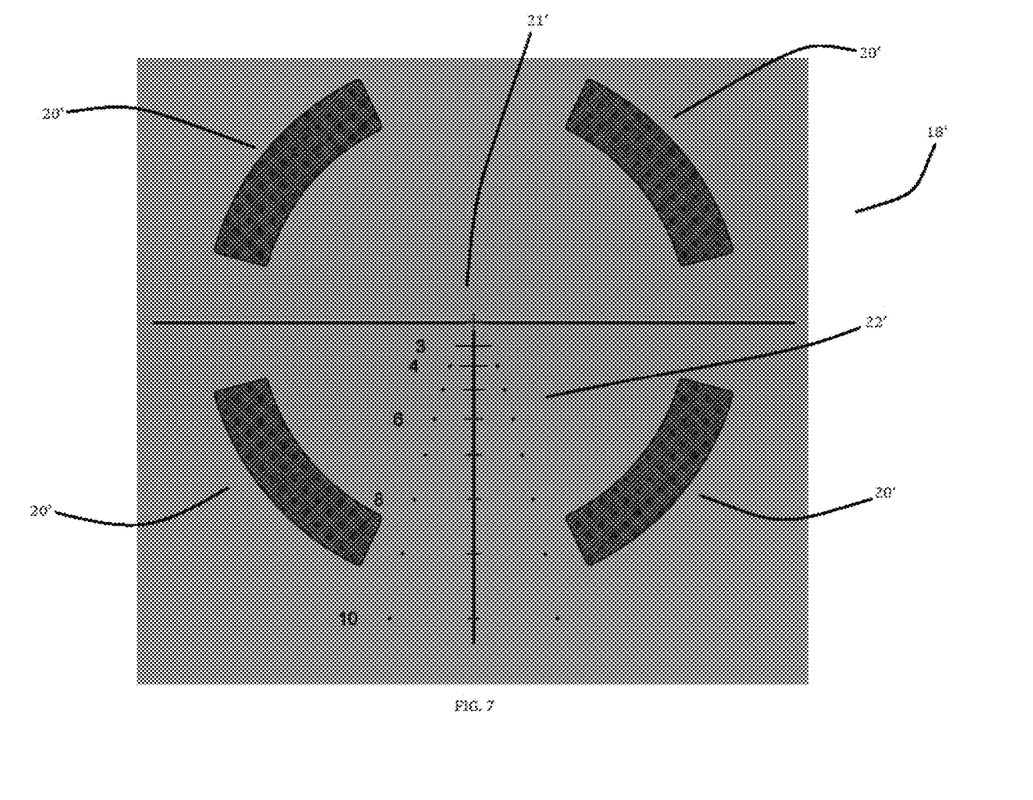
FIG. 7 shows the reticle of FIG. 6 at higher magnification.
Figure 8:
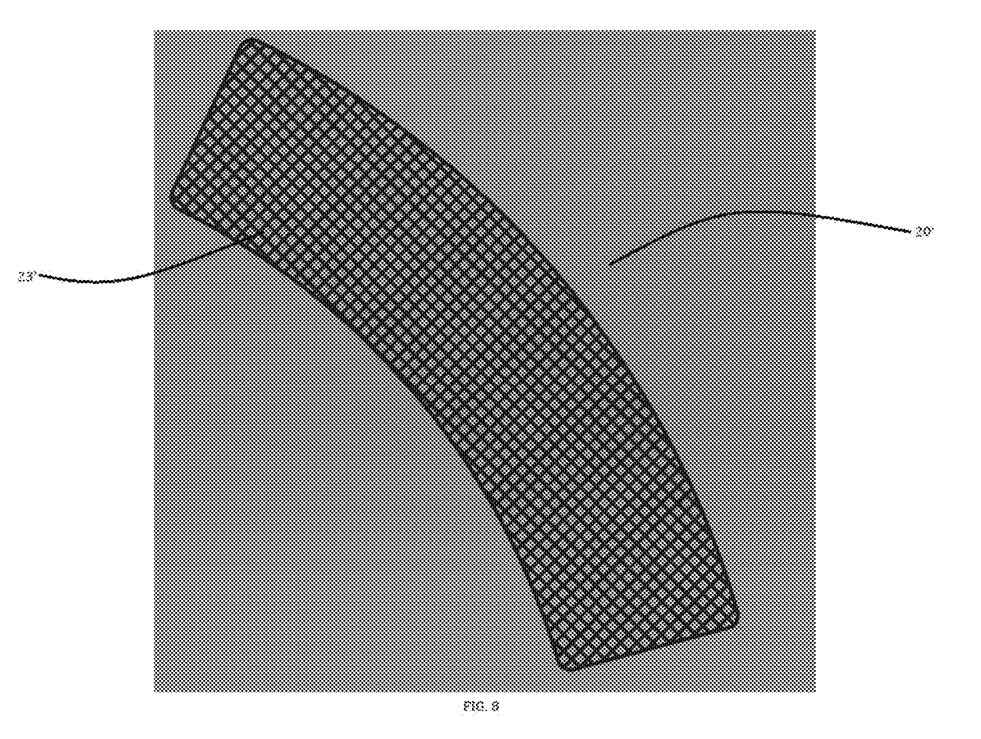
FIG. 8 shows a portion of the reticle of FIG. 6 in close-up.

FIG. 6 shows a further embodiment of a reticle 18'. In the embodiment shown in FIG. 6, the primary marking feature 19' is a broken circle reticle. At low (1×) magnification, the primary marking feature 19' appears as a broken circle made of four solid arcs 20' around a center point 21'. At higher magnifications, however, as shown in FIG. 7, the primary marking feature 19' is shown to be translucent. More specifically, and as shown in FIG. 8, the primary marking feature 19' is etched with a crosshatch pattern 23' to allow a portion of the light from a display to be visible through the reticle 18'.

Additional elements 22' of the reticle 18' are also shown in FIG. 7. As with additional elements 22, additional elements 22' are somewhat observable at low magnification, these additional elements 22' are more clearly visible at higher magnifications. As such, these additional elements 22' may have, but do not require, the same level of translucency as the primary marking feature 19'. It will be appreciated that the additional elements 22' may be the same as, or different than, those described with respect to additional elements 22.

While the present embodiments describe primary marking features which are post reticles and broke circle reticles, it will be appreciated that the primary marking feature may be any other type of primary marking feature known in the art, including, but not limited to, crosshairs, duplex crosshairs, post reticle, German reticle, ring reticle, triangle reticle, broken circle, and combinations thereof.

In embodiments in which a reticle incorporates a grid or proportioned marking of any kind, whether as the primary marking feature or an additional element, the markings may correlate to standard measurements known in the industry, including, but not limited to, MOA, mRad, or other angular or linear measurement values.

Figure 9A:
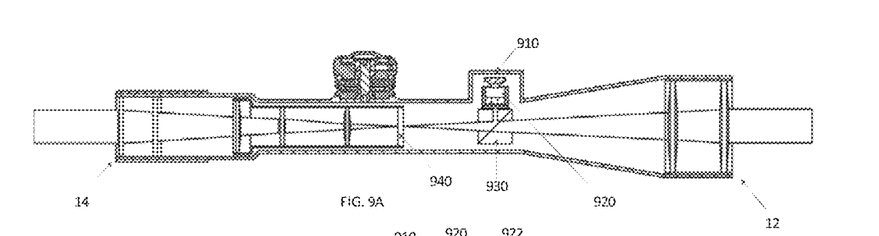
FIGS. 9A-9C are representative depictions of a viewing optic having an active display and a reticle with a primary marking feature that is translucent at the first focal plane. The reticle at the first focal plane can be any of the reticles disclosed herein and variations thereof.

FIG. 9A provides a representative depiction of a viewing optic having an active display 910, a collector lens system 920, a beam combiner 930 and a reticle disclosed herein at the first focal plane 940. The active display 910 generates and projects a digital image to the beam combiner so the digital image and the target image from the objective lens system can be combined at the first focal plane. The active display 910 is configured to emit light in a direction that is substantially perpendicular to an optical axis of the viewing optic. As discussed above, and as a representative, non-limiting example, the voids in the crosshatch pattern of the reticle allow light from the display to pass through, therefore not disturbing a projected digital image for a user.

Figures 9B, 9C:
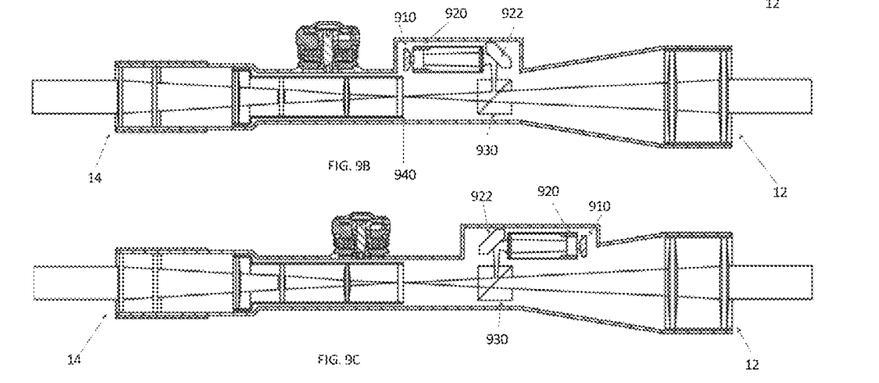

FIG. 9B provides a representative depiction of a viewing optic having an active display 910, a collector lens system 920, a reflective material 922, a beam combiner 930 and a reticle disclosed herein at the first focal plane 940. The active display 910 generates an image that is directed by the reflective material 922 to the beam combiner 930 so the digital image and the target image from the objective lens system can be combined at the first focal plane. The active display 910 is configured to emit light in a direction that is substantially parallel to an optical axis of the viewing optic. In this representative depiction, the active display 910 is located closer to the ocular assembly or eyepiece assembly and farther from the objective assembly. As discussed above, as a non-limiting example, the voids in the crosshatch pattern of the reticle allow light from the display to pass through, therefore not disturbing a projected digital image for a user.

FIG. 9C provides a representative depiction of a viewing optic having an active display 910, a collector lens system 920, a reflective material 922, a beam combiner 930 and a reticle disclosed herein at the first focal plane 940. The active display 910 generates an image that is directed by the reflective material 922 to the beam combiner 930 so the digital image and the target image from the objective lens system can be combined at the first focal plane. The active display 910 is configured to emit light in a direction that is substantially parallel to an optical axis of the viewing optic. In this representative depiction, the active display 910 is located closer to the objective assembly and farther from the ocular assembly or eyepiece. As discussed above, as a non-limiting example, the voids in the crosshatch pattern of the reticle allow light from the display to pass through, therefore not disturbing a projected digital image for a user.

In one embodiment, the disclosure relates to a viewing optic having a main body with a first optical system for viewing an outward image and an integrated display system for generating an image, wherein the image of the integrated display system is combined into the image of the first optical system in the first focal plane of the optic, wherein the first focal plane has a reticle with one or more marking features that are translucent. A reticle with one or more marking features that are translucent allows a greater proportion of the image generated by the integrated display system to be observed by the user of the viewing optic as compared to the amount or extent of image observed by a user of a viewing optic with a reticle lacking a marking feature that is translucent.

In one embodiment, the integrated display system comprises an active display, collector lens system, and a reflective surface or material, including but not limited to a mirror. In one embodiment, the active display can generate images including but not limited to text, alpha-numeric, graphics, symbols, and/or video imagery, icons, etc., including active target reticles, corrected aim-points, range measurements, and wind information.

In one embodiment, the disclosure relates to a viewing optic comprising: a body having (i) a first optical system having an objective lens system that focuses a target image from an outward scene to a first focal plane, an erector lens system that inverts the target image, a second focal plane, an ocular lens system for viewing the target image, (ii) a beam combiner; (iii) a second optical system with an active display for generating an image, and a reflective material that directs the generated image from the active display to the beam combiner, wherein the image of the integrated display system is combined into the image of the first optical system in the first focal plane of the optic, wherein the first focal plane has a reticle with a primary marking feature that is translucent.

In one embodiment, the disclosure relates to a viewing optic having a main body with a first optical system for viewing an outward image and an integrated display system for generating a digital image, wherein the digital image of the integrated display system is combined into the image of the first optical system in the first focal plane of the optic, wherein the first focal plane has a reticle with a marking feature that is translucent, wherein the translucent primary marking feature allows more of the digital image to be observed by a user of the viewing optic as compared to the amount of the digital image observed by a user of a viewing optic with a reticle that does not have a marking feature that is translucent.

Active Display

In one embodiment, the viewing optic has an active display. In one embodiment, the active display is controlled by a microcontroller or computer. In one embodiment, the active display is controlled by a microcontroller with an integrated graphics controller to output video signals to the display. In one embodiment, information can be sent wirelessly or via a physical connection into the viewing optic via a cable port. In still another embodiment, numerous input sources can be input to the microcontroller and displayed on the active display.

In one embodiment, the active display can be a reflective, transmissive or an emissive micro-display including but not limited to a micro display, transmissive active matrix LCD display (AMLCD), Organic light-emitting diode (OLED) display, Light-Emitting Diode (LED) display, e-ink display, a plasma display, a segment display, an electroluminescent display, a surface-conduction electron-emitter display, a quantum dot display, etc.

In one embodiment, the LED array is a micro-pixelated LED array and the LED elements are micro-pixelated LEDs (also referred to as micro-LEDs or µLEDs in the description) having a small pixel size generally less than 75 µm. In some embodiments, the LED elements may each have a pixel size ranging from approximately 8 µm to approximately 25 µm, and have a pixel pitch (both vertically and horizontally on the micro-LED array) ranging from approximately 10 µm to approximately 30 µm. In one embodiment, the micro-LED elements have a uniform pixel size of approximately 14 µm (e.g., all micro-LED elements are the same size within a small tolerance) and are arranged in the micro-LED array with a uniform pixel pitch of approximately 25 µm. In some embodiments, the LED elements may each have a pixel size of 25 µm or less and a pixel pitch of approximately 30 µm or less.

In some embodiments, the micro-LEDs may be inorganic and based on gallium nitride light emitting diodes (GaN LEDs). The micro-LED arrays (comprising numerous μLEDs arranged in a grid or other array) may provide a high-density, emissive micro-display that is not based on external switching or filtering systems. In some embodiments, the GaN-based, micro-LED array may be grown on, bonded on, or otherwise formed on a transparent sapphire substrate.

In one embodiment, the sapphire substrate is textured, etched, or otherwise patterned to increase the internal quantum efficiency and light extraction efficiency (i.e., to extract more light from the surface of the micro-LEDs) of the micro-LEDs. In other embodiments, silver nanoparticles may be deposited/dispersed on the patterned sapphire substrate to coat the substrate prior to bonding the micro-LEDs to further improve the light efficiency and output power of the GaN-based micro-LEDs and of the micro-LED array.

In one embodiment, the active display can be monochrome or can provide full color, and in some embodiments, can provide multi-color. In other embodiments, other suitable designs or types of displays can be employed. The active display can be driven by electronics. In one embodiment, the electronics can provide display functions, or can receive such functions from another device in communication therewith.

In one embodiment, the active display can be part of a backlight/display assembly, module or arrangement, having a backlight assembly including a backlight illumination or light source, device, apparatus or member, such as an LED backlight for illuminating the active display with light. In some embodiments, the backlight source can be a large area LED and can include a first or an integrated lens for collecting and directing generated light to a second, illumination or condenser lens, for collecting, concentrating and directing the light onto active display, along display optical axis B, with good spatial and angular uniformity. The backlight assembly and the active display are able to provide images with sufficient high brightness luminance to be simultaneously viewed with a very high brightness real world view through optics, while being at low power.

The backlight color can be selected to be any monochrome color, or can be white to support a full color microdisplay. Other backlight design elements can be included, such as other light sources, waveguides, diffusers, micro-optics, polarizers, birefringent components, optical coatings and reflectors for optimizing performance of the backlight, and which are compatible with the overall size requirements of the active display, and the luminance, power and contrast needs.

Representative examples of micro displays that can be used include but are not limited to: Microoled, including MDP01 (series) DPYM, MDP02, and MDP05; Emagin such as the SVGA, micro-displays with pixel pitches are 9.9×9.9 micron and 7.8×7.8 micron, and Lightning Oled Microdisplay, such as those produced by Kopin Corporation. Micro LED displays can also be used including but not limited to those produced by VueReal and Lumiode.

In one embodiment, the electronics working with the active display can include the ability to generate display symbols, format output for the display, and include battery information, power conditioning circuitry, video interface, serial interface and control features. Other features can be included for additional or different functionality of the display overlay unit. The electronics can provide display functions, or can receive such functions from another device in communication therewith.

In one embodiment, the active display can generate images including but not limited to text, alpha-numeric, graphics, symbols, and/or video imagery, icons, etc., including active target reticles, range measurements and wind information, GPS and compass information, firearm inclination information, target finding, recognition and identification (ID) information, and/or external sensor information (sensor video and/or graphics), or images for situational awareness, for viewing through the eyepiece along with the images of the view seen through optics. The direct viewing optics can include or maintain an etched reticle and bore sight, and retain high resolution.

In one embodiment, the utilization of an active display allows for a programmable electronic aiming point to be displayed at any location in the field of view. This location could be determined by the user (as in the case of a rifle that fires both supersonic and subsonic ammo and thus has two different trajectories and "zeros"), or could be calculated based upon information received from a ballistic calculator. This would provide a "drop compensated" aiming point for long range shooting that could be updated on a shot to shot interval.

In one embodiment, the active display can be oriented to achieve maximum vertical compensation. In one embodiment, the active display is positioned to be taller than it is wide.

In one embodiment, the viewing optic further comprises a processor in electronic communication with the active display.

In another embodiment, the viewing optic may include memory, at least one sensor, and/or an electronic communication device in electronic communication with the processor.

Beam Combiner

In one embodiment, the main body of the viewing optic has a beam combiner. In one embodiment, the beam combiner is one or more prismatic lenses (the prismatic lenses constitute the beam combiner). In another embodiment, the main body of the riflescope has a beam combiner that combines images generated from an active display with images generated from the viewing optics along the viewing optical axis of the riflescope.

In one embodiment, a beam combiner is used to combine a generated image from an integrated display system with an image from an optical system for viewing an outward image, wherein the optical system is located in a main body of a riflescope, in front of a first focal plane in the main body, and then the combined image is focused onto the first focal plane, such that the generated image and the viewed image did not move in relation to one another. With the combined image focused onto the first focal plane, an aiming reference generated by the integrated display system will be accurate regardless of adjustments to the movable erector system.

In one embodiment, a beam combiner can be aligned with the integrated display system along the display optical axis, and positioned along the viewing optical axis of the viewing optics of the main body of a riflescope, thereby allowing for the images from the integrated display to be directed onto the viewing optical axis for combining with the field of view of the viewing optics in an overlaid manner.

In another embodiment, the beam combiner and the integrated display system are in the same housing. In one embodiment, the beam combiner is approximately 25 mm from the objective assembly.

In one embodiment, the beam combiner is approximately 5 mm distance from the objective assembly. In one embodiment the beam combiner is positioned at a distance from the objective assembly including but not limited to from 1 mm to 5 mm, or from 5 mm to 10 mm or from 5 mm to 15 mm, or from 5 mm to 20 mm, or from 5 mm to 30 mm, or from 5 mm to 40 mm or from 5 to 50 mm.

In yet another embodiment, the beam combiner is positioned at a distance from the objective assembly including but not limited to from 1 mm to 4 mm, or from 1 mm to 3 mm, or from 1 mm to 2 mm.

In one embodiment, the beam combiner is positioned at a distance from the objective assembly including but not limited to at least 3 mm, at least 5 mm, at least 10 mm, and at least 20 mm. In yet another embodiment, the beam combiner is positioned at a distance from the objective assembly from 3 mm to 10 mm.

In another embodiment, the beam combiner is approximately 150 mm distance from the ocular assembly. In one embodiment the beam combiner is positioned at a distance from the ocular assembly including but not limited to from 100 mm to 200 mm or from 125 mm to 200 mm or from 150 mm to 200 mm or from 175 mm to 200 mm.

In one embodiment the beam combiner is positioned at a distance from the ocular assembly including but not limited to from 100 mm to 175 mm or from 100 mm to 150 mm or from 100 mm to 125 mm.

In one embodiment the beam combiner is positioned at a distance from the ocular assembly including but not limited to from 135 mm to 165 mm or from 135 mm to 160 mm or from 135 mm to 155 mm or from 135 mm to 150 mm or from 135 mm to 145 mm or from 135 mm to 140 mm.

In one embodiment the beam combiner is positioned at a distance from the ocular assembly including but not limited to from 140 mm to 165 mm or from 145 mm to 165 mm or from 150 mm to 165 mm or from 155 mm to 165 mm or from 160 mm to 165 mm.

In one embodiment the beam combiner is positioned at a distance from the ocular assembly including but not limited to at least 140 mm or at least 145 mm or at least 150 mm or at least 155 mm.

In still another embodiment, the main body has a beam combiner, wherein the beam combiner is located beneath the elevation turret on the outside center part of the scope body.

In one embodiment, the beam combiner can have a partially reflecting coating or surface that reflects and redirects the output or at least a portion of the active display output from the integrated display system onto the viewing axis to the viewer's eye at eyepiece while still providing good transmissive see-through qualities for the direct viewing optics path.

In one embodiment, the beam combiner can be a cube made of optical material, such as optical glass or plastic materials with a partially reflective coating. The coating can be a uniform and neutral color reflective coating, or can be tailored with polarizing, spectrally selective or patterned coatings to optimize both the transmission and reflection properties in the eyepiece. The polarization and/or color of the coating can be matched to the active display. This can optimize reflectance and efficiency of the display optical path with minimal impact to the direct viewing optics transmission path.

Although the beam combiner is shown as a cube, in some embodiments, the beam combiner can have different optical path lengths for the integrated display system, and the direct viewing optics along viewing optical axis A. In some embodiments, the beam combiner can be of a plate form, where a thin reflective/transmissive plate can be inserted in the direct viewing optics path across the optical axis A.

In one embodiment, the position of the beam combiner can be adjusted in relation to the reflective material to eliminate any errors, including but not limited to parallax error. The position of the beam combiner can adjusted using a screw system, a wedge system or any other suitable mechanism.

In one embodiment, the position of the beam combiner can be adjusted in relation to the erector tube to eliminate any errors, including but not limited to parallax error.

Collector Lens System

In one embodiment, viewing optic can have a collector lens system 920 to collect light from the active display. In one embodiment, the viewing has an optical system based upon the use of optical lenses as a part of one or more lens cells, which include the lens itself and a lens cell body to which the lens is mounted. In one embodiment, the lens cell includes a precision formed body that is generally cylindrical or disc shaped. This body has a central aperture for mounting the lens in alignment with an optical axis of a larger optical system. The cell body can also be said to have its own alignment axis, which will ultimately be aligned with the optical axis for the larger system when the lens cell is mounted therein. In addition, the lens cell serves as a "holder" for the lens, serves as a mechanism by which the lens can be mounted to and in the larger optical system, and (finally) serves as a means by which the lens can be manipulated by and for the purposes of that system.

In one embodiment, the integrated display system comprises a collector lens system, also referred to as a lens system. In one embodiment, the collector lens system comprises an inner lens cell and an outer lens cell.

Reflective Material

In one embodiment, the viewing optic comprises a reflective material 922. In one embodiment, the reflective material 922 is a mirror. In one embodiment, the viewing optic comprises one or more mirrors. In one embodiment, the integrated display system comprises two, three, four or more mirrors.

In one embodiment, the mirror is positioned at an angle from 30° to 60°, or from 30° to 55°, 30° to 50°, or from 30° to 45°, or from 30° to 40°, or from 30° to 35° relative to the emitted light of the display.

In one embodiment, the mirror is positioned at an angle from 30° to 60°, or from 35° to 60°, 40° to 60°, or from 45° to 60°, or from 50° to 60°, or from 55° to 60° relative to the emitted light of the display.

In one embodiment, the mirror is positioned at an angle of at least 40°. In one embodiment, the mirror is positioned at an angle of 45° relative to the emitted light of the display.

In one embodiment, the position of the mirror can be adjusted in relation to the beam combiner to eliminate any errors, including but not limited to parallax error.

In one embodiment, the position of the mirror can be adjusted in relation to the active display to eliminate any errors, including but not limited to parallax error.

In one embodiment, the display for generating digital images are injected into the first focal plane of the main body, such that the digital image in the first focal plane is not tied to the movement of the erector tube.

In one embodiment, the active display is configured to emit light in a direction that is substantially parallel to an optical axis of the viewing scope.

In one embodiment, the active display is configured to emit light in a direction that is substantially perpendicular to an optical axis of the viewing scope.

In one embodiment, the mirror is oriented at an angle of approximately 45° relative to the emitted light of the display.

In one embodiment, the display and the mirror are located on a common side of the viewing optic main body.

In one embodiment, the display and the mirror are located on opposite sides of the viewing optic main body.

The apparatuses and methods disclosed herein can be further described in the following paragraphs:

1. A reticle comprising a marking feature that is translucent. In some embodiment, the marking feature is a primary marking feature, 2. The reticle of any of the preceding paragraphs, wherein the primary marking feature is made from an etched pattern, a gradient, a coating, paint, a filament, or combination thereof.

3. The reticle of any of the preceding paragraphs, wherein the primary marking feature is etched with a pattern.

4. The reticle of any of the preceding paragraphs, wherein the pattern is a crosshatch pattern.

5. The reticle of any of the preceding paragraphs, wherein the primary marking feature is selected from the group consisting of crosshairs, duplex crosshairs, post reticle, German reticle, ring reticle, triangle reticle, broken circle, and combinations thereof.

6. The reticle of any of the preceding paragraphs further including an additional element selected from the group consisting of center dot, crosshairs, range estimation feature, drop estimation feature, wind point-of-impact estimation feature, moving target point-of-impact feature, and combinations thereof.

7. The reticle of any of the preceding paragraphs, wherein the additional element is not translucent.

8. The reticle of any of the preceding paragraphs, wherein the additional element is translucent.

9. The reticle of any of the preceding paragraphs, wherein the amount of light passing through the primary marking feature is from less than 100% to greater than or equal to 60%.

10. The reticle of any of the preceding paragraphs, wherein the amount of light passing through the primary marking feature is from less than or equal to 96% to greater than or equal to 66%.

11. The reticle of any of the preceding paragraphs, wherein the amount of light passing through the primary marking feature is from less than or equal to 88% to greater than or equal to 74%.

12. A viewing optic comprising the reticle of any of the preceding paragraphs.

13. The viewing optic of paragraph 12 wherein the viewing optic is a gunsight.

14. A viewing optic comprising: a housing; an objective lens assembly mounted within a first end of the housing; an ocular lens assembly mounted within a second end of the housing; one or more optical components mounted within the housing between the objective lens assembly and ocular lens assembly; and a reticle comprising a primary marking feature which is translucent.

15. The viewing optic of any of the preceding paragraphs, wherein the reticle is located at a first focal plane.

16. The viewing optic of any of the preceding paragraphs, wherein the reticle is located at a second focal plane.

17. The viewing optic of any of the preceding paragraphs, wherein the primary marking feature of the reticle is made from an etched pattern, a gradient, a coating, paint, a filament, or combination thereof.

18. The viewing optic of any of the preceding paragraphs, wherein the amount of light passing through the primary marking feature of the reticle is from less than 100% to greater than or equal to 60%.

19. The viewing optic of any of the preceding paragraphs, wherein the amount of light passing through the primary marking feature of the reticle is from less than or equal to 88% to greater than or equal to 74%.

20. A viewing optic comprising: a body having (i) a first optical system having an objective lens system that focuses a target image from an outward scene to a first focal plane having a reticle of any of the preceding paragraphs and (ii) a beam combiner between the objective lens system and the first focal plane; and a second optical system with an active display and a lens system that collects the light from the active display, and (ii) a mirror that directs the image from the active display to the beam combiner where the image from the active display and the target image from the objective lens system are combined into the first focal plane and viewed simultaneously.

21. A viewing optic comprising: an optical system configured to define a first focal plane having a reticle of any of the preceding paragraphs; an active display for generating a digital image, wherein the digital image is superimposed on the first focal plane; and a controller coupled to the active display, the controller configured to selectively power one or more display elements to generate the digital image.

22. A viewing optic comprising: (a) a main tube; (b) an objective system coupled to a first end of the main tube; (c) an ocular system coupled to the second end of the main tube, the main tube, objective system and ocular system being configured to define at least a first focal plane having a reticle of any of the preceding paragraphs; and (d) a beam combiner positioned between the objective assembly and the first focal plane.

23. A viewing optic comprising: (a) a main tube; (b) an objective system coupled to a first end of the main tube that focuses a target image from an outward scene; (c) an ocular system coupled to the second end of the main tube, the main tube, objective system and ocular system being configured to define at least a first focal plane having a reticle of any of the preceding paragraphs; (d) a beam combiner positioned between the objective assembly and the first focal plane; and (e) an active display for generating an image and directing the image to the beam combiner, wherein the generated image and the target image are combined into the first focal plane.

24. A viewing optic comprising: a body having an objective lens system at one end that focuses a target image from an outward scene, an ocular lens system at the other end and a movable erector tube with an erector lens system located between the objective and ocular systems, the movable erector lens system, the objective lens system and the ocular lens system forming a first optical system having a first focal plane having a reticle of any of the preceding paragraphs, wherein the reticle at the first focal plane moves in conjunction with the movable erector tube and a beam combiner located between the first focal plane and the objective assembly; and a second optical system with an active display for generating an image and a lens system that collects light from the active display, and a reflective material that directs the generated image from the active display to the beam combiner where the image from the active display and the target image from the objective lens system are combined into the first focal plane and viewed simultaneously.

25. A viewing optic comprising: (a) a main tube; (b) an objective system coupled to a first end of the main tube that focuses a target image from an outward scene; (c) an ocular system coupled to the second end of the main tube, the main tube, objective system and ocular system being configured to define at least a first focal plane, with a first reticle at the first focal plane of any of the preceding paragraphs, wherein the first reticle moves in relation to turret adjustments; (d) a beam combiner positioned between the objective assembly and the first focal plane; and (e) an active display for generating an image and directing the image to the beam combiner, wherein the generated image and the target image are combined into the first focal plane.

All publications and patents mentioned in the above specification are herein incorporated by reference. Various modifications and variations of the described compositions and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific preferred embodiments, it should be understood that the invention should not be unduly limited to such specific embodiments. While the preferred embodiments have been described in detail, and shown in the accompanying drawings, it will be evident that various further modification are possible without departing from the scope of the invention as set forth in the appended claims. Indeed, various modifications of the described modes for carrying out the invention which are obvious to those skilled in marksmanship, computers or related fields are intended to be within the scope of the following claims.

What is claimed is:

1. A reticle comprising: a primary marking feature and a center, the primary marking feature having a first marking, a second marking and a third marking, wherein the first marking, the second marking, and the third marking are etched with a crosshatch pattern to generate voids, and further wherein the primary marking feature appears as a solid marking at a low magnification setting of a viewing optic, and translucent at a high magnification setting of a viewing optic.

2. The reticle of claim 1 further including an additional element selected from the group consisting of center dot, crosshairs, range estimation feature, drop estimation feature, wind point-of-impact estimation feature, moving target point-of-impact feature, and combinations thereof.

3. The reticle of claim 2, wherein the additional element is not translucent.

4. The reticle of claim 2, wherein the additional element is translucent.

5. The reticle of claim 1, wherein the amount of light passing through the primary marking feature is from less than 100% to greater than or equal to 60%.

6. The reticle of claim 5, wherein the amount of light passing through the primary marking feature is from less than or equal to 96% to greater than or equal to 66%.

7. The reticle of claim 6, wherein the amount of light passing through the primary marking feature is from less than or equal to 88% to greater than or equal to 74%.

8. A viewing optic comprising the reticle of claim 1.

9. The viewing optic of claim 8, wherein the viewing optic is a gunsight.

10. A viewing optic comprising:
a housing;
an objective lens assembly mounted within a first end of the housing;
an ocular lens assembly mounted within a second end of the housing;
one or more optical components mounted within the housing between the objective lens assembly and ocular lens assembly; and
a reticle comprising a primary marking feature and a center, the primary marking feature having a first marking, a second marking and a third marking, wherein the first marking, the second marking, and the third marking are etched with a crosshatch pattern to generate voids, and further wherein the primary marking feature appears as a solid marking at a low magnification setting of the viewing optic, and translucent at a high magnification setting of the viewing optic.

11. The viewing optic of claim 10, wherein the reticle is located at a first focal plane.

12. The viewing optic of claim 10, wherein the reticle is located at a second focal plane.

13. The viewing optic of claim 10, wherein the amount of light passing through the primary marking feature of the reticle is from less than 100% to greater than or equal to 60%.

14. The viewing optic of claim 13, wherein the amount of light passing through the primary marking feature of the reticle is from less than or equal to 88% to greater than or equal to 74%.

* * * * *